US012680497B2

(12) United States Patent
Snyder et al.

(10) Patent No.: US 12,680,497 B2
(45) Date of Patent: Jul. 14, 2026

(54) GASEOUS FUEL AND LIQUID WATER INJECTION FOR TURBINE ENGINE

(71) Applicant: Raytheon Technologies Corporation, Farmington, CT (US)

(72) Inventors: Timothy S. Snyder, Glastonbury, CT (US); Justin M. Locke, Tolland, CT (US); Wookyung Kim, Glastonbury, CT (US); Lance L. Smith, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/211,067

(22) Filed: Jun. 16, 2023

(65) Prior Publication Data

US 2024/0418127 A1 Dec. 19, 2024

(51) Int. Cl.
| | |
|---|---|
| *F02C 3/30* | (2006.01) |
| *F02C 3/22* | (2006.01) |
| *F02C 7/22* | (2006.01) |
| *F02C 9/40* | (2006.01) |
| *F23L 7/00* | (2006.01) |
| *F23R 3/28* | (2006.01) |
| *F23R 3/36* | (2006.01) |

(52) U.S. Cl.
CPC ................. *F02C 3/30* (2013.01); *F02C 3/22* (2013.01); *F02C 7/22* (2013.01); *F02C 9/40* (2013.01); *F23L 7/002* (2013.01); *F23R 3/28* (2013.01); *F23R 3/36* (2013.01); *F23L 2900/07008* (2013.01)

(58) Field of Classification Search
CPC ..... F23L 2900/07008; F02C 3/22; F02C 3/30; F02C 7/22; F02C 9/40; F23R 3/28; F23R 3/36; F23K 5/002; F23C 2900/9901
See application file for complete search history.

(56) References Cited

U.S. PATENT DOCUMENTS

| | | | | |
|---|---|---|---|---|
| 5,146,741 A | | 9/1992 | Sood | |
| 5,259,184 A | * | 11/1993 | Borkowicz | ............. F23D 14/00 60/737 |
| 5,404,711 A | * | 4/1995 | Rajput | .................... F23L 7/002 60/737 |

(Continued)

FOREIGN PATENT DOCUMENTS

| | | |
|---|---|---|
| EP | 3220050 A1 | 9/2017 |
| WO | 9322601 W | 11/1993 |

OTHER PUBLICATIONS

EP Search Report for EP Patent Application No. 24170650.6 dated Sep. 16, 2024.

(Continued)

*Primary Examiner* — Alain Chau
(74) *Attorney, Agent, or Firm* — Getz Balich LLC

(57) ABSTRACT

A method of operation is provided during which a fuel-water mixture is directed within a first passage of a fuel injector to a first passage outlet of the fuel injector. The fuel-water mixture includes liquid water and gaseous fuel. The fuel-water mixture is injected into a combustion chamber through the first passage outlet. The combustion chamber is within a combustor of a turbine engine. A fuel-air mixture within the combustion chamber is ignited. The fuel-air mixture includes the gaseous fuel.

13 Claims, 8 Drawing Sheets

(56)  References Cited

U.S. PATENT DOCUMENTS

|  |  |  |  |  |
|---|---|---|---|---|
| 5,426,933 | A * | 6/1995 | Maden | F23C 7/004 |
|  |  |  |  | 60/742 |
| 5,669,218 | A * | 9/1997 | Greninger | F23L 7/002 |
|  |  |  |  | 60/737 |
| 5,816,041 | A * | 10/1998 | Greninger | F23R 3/286 |
|  |  |  |  | 60/776 |
| 7,082,765 | B2 | 8/2006 | Fortuna |  |
| 7,127,899 | B2 | 10/2006 | Sprouse |  |
| 8,621,870 | B2 | 1/2014 | Carroni |  |
| 9,523,311 | B2 | 12/2016 | Carroni |  |
| 9,958,152 | B2 | 5/2018 | Ramier |  |
| 10,041,417 | B2 | 8/2018 | Horikawa |  |
| 10,132,240 | B2 * | 11/2018 | Ramier | F23L 7/002 |
| 10,208,960 | B2 * | 2/2019 | Brautsch | F02C 3/28 |
| 10,228,137 | B2 | 3/2019 | Kopp-Vaughan |  |
| 10,443,853 | B2 * | 10/2019 | Okada | F23R 3/28 |
| 11,397,006 | B2 * | 7/2022 | Okada | F23L 7/002 |
| 2006/0042253 | A1 * | 3/2006 | Fortuna | F23R 3/36 |
|  |  |  |  | 60/740 |
| 2007/0031768 | A1 * | 2/2007 | Schefer | F23L 7/00 |
|  |  |  |  | 431/4 |
| 2010/0146984 | A1 * | 6/2010 | Carroni | F23L 7/002 |
|  |  |  |  | 60/775 |
| 2010/0269516 | A1 * | 10/2010 | Brautsch | F02C 6/18 |
|  |  |  |  | 60/670 |
| 2011/0314831 | A1 | 12/2011 | Abou-Jaoude |  |
| 2011/0314833 | A1 * | 12/2011 | Symonds | F23L 7/002 |
|  |  |  |  | 29/889.2 |
| 2013/0098041 | A1 * | 4/2013 | Zhang | F23K 5/005 |
|  |  |  |  | 60/734 |
| 2014/0283498 | A1 * | 9/2014 | Horikawa | F23R 3/283 |
|  |  |  |  | 60/39.19 |
| 2015/0275755 | A1 * | 10/2015 | Ogata | F23R 3/286 |
|  |  |  |  | 60/737 |
| 2016/0169110 | A1 * | 6/2016 | Myers | F23R 3/36 |
|  |  |  |  | 60/776 |
| 2016/0169523 | A1 * | 6/2016 | Okada | F02C 3/20 |
|  |  |  |  | 60/740 |
| 2016/0209038 | A1 * | 7/2016 | Kopp-Vaughan | F23R 3/28 |
| 2017/0082024 | A1 * | 3/2017 | Rodd | F02C 3/30 |
| 2017/0204785 | A1 * | 7/2017 | Ramier | F02C 7/22 |
| 2017/0211805 | A1 * | 7/2017 | Ramier | F23D 17/002 |
| 2019/0032919 | A1 * | 1/2019 | Okada | F23D 11/10 |
| 2020/0018232 | A1 * | 1/2020 | Rodd | F02C 3/22 |
| 2022/0213837 | A1 * | 7/2022 | Berger | F02C 3/30 |
| 2023/0296253 | A1 * | 9/2023 | Miranda | F02C 6/18 |
|  |  |  |  | 60/773 |
| 2023/0340915 | A1 * | 10/2023 | Speak | B64D 27/10 |

OTHER PUBLICATIONS

EP Office Action for EP Patent Application No. 24170650.6 dated Aug. 7, 2025.

\* cited by examiner

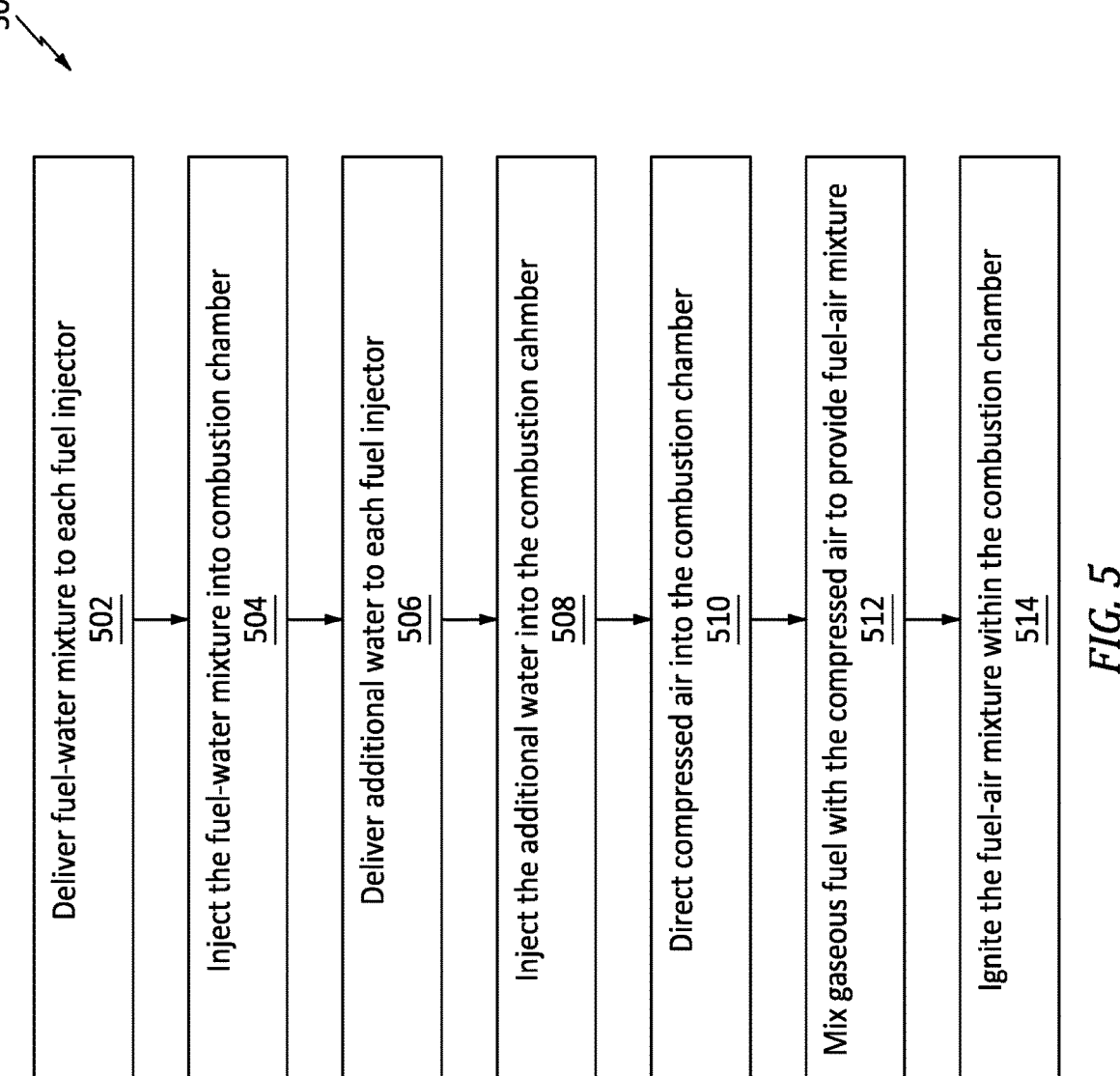

500

Deliver fuel-water mixture to each fuel injector
502

Inject the fuel-water mixture into combustion chamber
504

Deliver additional water to each fuel injector
506

Inject the additional water into the combustion cahmber
508

Direct compressed air into the combustion chamber
510

Mix gaseous fuel with the compressed air to provide fuel-air mixture
512

Ignite the fuel-air mixture within the combustion chamber
514

*FIG. 5*

GASEOUS FUEL AND LIQUID WATER INJECTION FOR TURBINE ENGINE

GOVERNMENT LICENSE RIGHTS

This invention was made with Government support under Contract DE-FE0032171 awarded by the United States Department of Energy. The Government has certain rights in the invention.

BACKGROUND OF THE DISCLOSURE

1. Technical Field

This disclosure relates generally to a gas turbine engine and, more particularly, to fueling a gas turbine engine.

2. Background Information

A gas turbine engine includes a fuel system to deliver fuel to a combustor for combustion. Various types and configurations of fuel systems are known in the art. While these known fuel systems have various benefits, there is still room in the art for improvement.

SUMMARY OF THE DISCLOSURE

According to an aspect of the present disclosure, a method of operation is provided during which a fuel-water mixture is directed within a first passage of a fuel injector to a first passage outlet of the fuel injector. The fuel-water mixture includes liquid water and gaseous fuel. The fuel-water mixture is injected into a combustion chamber through the first passage outlet. The combustion chamber is within a combustor of a turbine engine. A fuel-air mixture within the combustion chamber is ignited. The fuel-air mixture includes the gaseous fuel.

According to another aspect of the present disclosure, another method of operation is provided during which a fuel-water mixture is injected out of a fuel injector and into a combustion chamber. The fuel-water mixture includes liquid water and gaseous fuel. The gaseous fuel is or otherwise includes hydrogen gas. The combustion chamber is within a combustor of a turbine engine. A fuel-air mixture is ignited within the combustion chamber to generate combustion products. The fuel-air mixture includes the gaseous fuel. The combustion products are directed across a turbine rotor of the turbine engine to drive rotation of the turbine rotor and rotation of a driven rotor of a mechanical load coupled to the turbine rotor.

According to still another aspect of the present disclosure, another method of operation is provided during which a fluid system of a turbine engine is operated in a first mode. The operating of the fluid system in the first mode includes: directing a fuel-water mixture out of a first passage of a fuel injector and into a combustion chamber, where the fuel-water mixture includes liquid water and a first gaseous fuel, and where the combustion chamber is within a combustor of a turbine engine; and igniting a first fuel-air mixture within the combustion chamber, where the first fuel-air mixture includes the first gaseous fuel. The fluid system is operated in a second mode. The operating of the fluid system in the second mode includes: directing a second gaseous fuel out of the first passage and into the combustion chamber; and igniting a second fuel-air mixture within the combustion chamber, where the second fuel-air mixture includes the second gaseous fuel.

The second gaseous fuel may be directed through the first passage without any liquid water during the second mode.

The first gaseous fuel may be or otherwise include a non-hydrocarbon fuel. The second gaseous fuel may be or otherwise include a hydrocarbon fuel.

The method may also include operating the fluid system in a third mode. The operating of the fluid system in the third mode may include: directing a liquid fuel out of a second passage of the fuel injector and into the combustion chamber; and igniting a third fuel-air mixture within the combustion chamber, where the third fuel-air mixture includes the liquid fuel.

The gaseous fuel may be or otherwise include a gaseous non-hydrocarbon fuel.

The gaseous fuel may be or otherwise include a gaseous hydrocarbon fuel.

The gaseous fuel may be or otherwise include hydrogen gas.

The gaseous fuel may also include methane gas.

A ratio of a quantity of the hydrogen gas to a quantity of the methane gas within the gaseous fuel may be equal to or less than one.

A ratio of a quantity of the hydrogen gas to a quantity of the methane gas within the gaseous fuel may be greater than one.

The fuel-water mixture may only include the liquid water and the hydrogen gas.

The method may also include: mixing the liquid water with the gaseous fuel outside of the fuel injector to provide the fuel-water mixture; and directing the fuel-water mixture into the fuel injector through a first passage inlet of the fuel injector.

The method may also include: directing additional liquid water within a second passage of the fuel injector to a second passage outlet of the fuel injector, where the second passage is fluidly discrete from the first passage; and injecting the additional liquid water into the combustion chamber through the second passage outlet.

A ratio of a quantity of the liquid water within the fuel-water mixture to a quantity of the additional liquid water may be less than one.

The liquid water within the fuel-water mixture may account for between thirty percent and seventy percent of water introduced into the combustion chamber through the fuel injector.

The additional water may be injected into the combustion chamber as a flow of the additional liquid water. The fuel-water mixture may be injected into the combustion chamber as a flow of the fuel-water mixture. The flow of the fuel-water mixture may circumscribe the flow of the additional liquid water.

The method may also include directing a flow of compressed air out of the fuel injector as a flow of compressed air. The fuel-water mixture may be injected into the combustion chamber as a flow of the fuel-water mixture. The flow of the fuel-water mixture may circumscribe the flow of compressed air.

The method may also include directing a flow of compressed air out of the fuel injector as a flow of compressed air. The fuel-water mixture may be injected into the combustion chamber as a flow of the fuel-water mixture. The flow of compressed air may circumscribe the flow of the fuel-water mixture.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 5 is a flow diagram of a method of operation for a powerplant.

DETAILED DESCRIPTION

Figure 1:
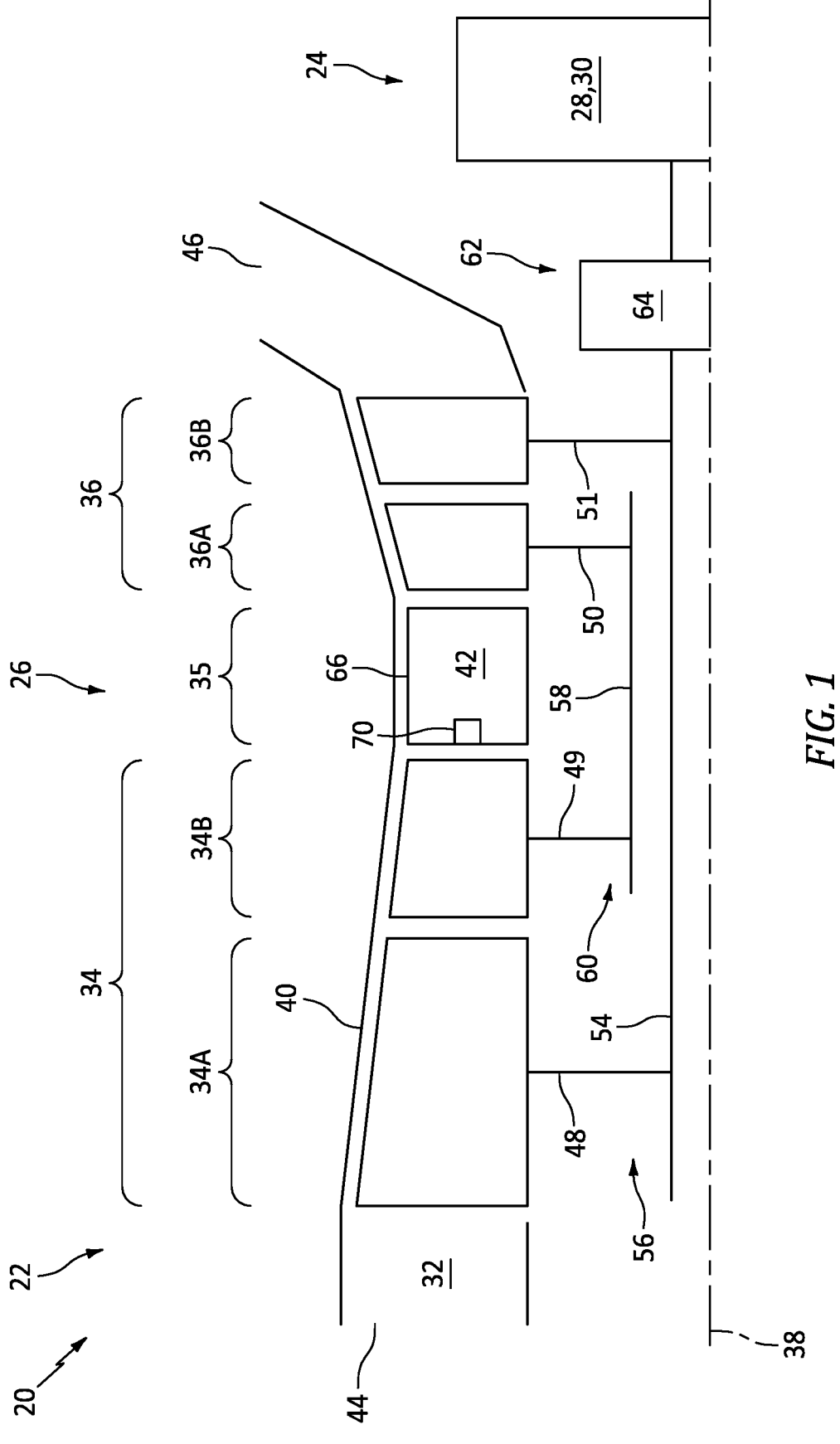
FIG. 1 is a partial schematic illustration of a powerplant powered by a turbine engine.

FIG. 1 illustrates a powerplant 20 powered by a gas turbine engine 22. The powerplant 20 may be configured as, or otherwise included as part of, an electric power system. This electric power system may be an industrial power system (e.g., a ground-based power system) or an auxiliary power unit (APU) for a mobile unit. The powerplant 20 may also or alternatively be configured as, or otherwise included as part of, a propulsion system for the mobile unit. For example, where the mobile unit is an aircraft, the powerplant 20 may be a turbofan propulsion system, a turbojet propulsion system, a turboprop propulsion system, a turboshaft propulsion system, a propfan propulsion system, a pusher fan propulsion system or any other type of ducted or open rotor propulsion system. The powerplant 20 of FIG. 1 includes a mechanical load 24 and a core 26 of the turbine engine 22.

The mechanical load 24 of FIG. 1 includes a rotor 28 mechanically driven by the engine core 26. This driven rotor 28 may be a generator rotor 30 in an electric power generator where the powerplant 20 is (or is part of) the electric power system. Alternatively, the driven rotor 28 may be a bladed propulsor rotor where the powerplant 20 is (or is part of) the aircraft propulsion system. The driven rotor 28, for example, may be a ducted propulsor rotor or an open (e.g., un-ducted) propulsor rotor. Examples of the ducted propulsor rotor include, but are not limited to, a fan rotor for the turbofan propulsion system and a (e.g., first stage) compressor rotor for the turbojet propulsion system. Examples of the open propulsor rotor include, but are not limited to, a propfan rotor for the propfan propulsion system, a pusher fan rotor for the pusher fan propulsion system, a propeller rotor for the turboprop propulsion system, and a rotorcraft rotor (e.g., a main helicopter rotor) for the turboshaft propulsion system. However, for ease of description, the powerplant 20 may be generally described below as the electric power system, and the driven rotor 28 may be generally described below as the generator rotor 30 for the electric power generator.

The engine core 26 includes a core flowpath 32, a compressor section 34, a combustor section 35 and a turbine section 36. The compressor section 34 of FIG. 1 includes a low pressure compressor (LPC) section 34A and a high pressure compressor (HPC) section 34B. The turbine section 36 of FIG. 1 includes a high pressure turbine (HPT) section 36A and a low pressure turbine (LPT) section 36B. These engine sections 34A-36B may be arranged sequentially along an axial centerline 38 of the turbine engine 22 and its engine core 26 within an engine housing 40. The present disclosure, however, is not limited to such an axial arrangement. For example, the combustor section 35 may alternatively be radially outboard of and at least axially overlap the turbine section 36 in other embodiments.

The core flowpath 32 extends sequentially through the LPC section 34A, the HPC section 34B, the combustor section 35 and its (e.g., annular) combustion chamber 42, the HPT section 36A and the LPT section 36B from an airflow inlet 44 into the core flowpath 32 to a combustion products exhaust 46 from the core flowpath 32. The core inlet 44 may be configured as an airflow inlet into the turbine engine 22. The core exhaust 46 may be configured as a combustion products exhaust from the turbine engine 22.

The LPC section 34A includes a bladed low pressure compressor (LPC) rotor 48. The HPC section 34B includes a bladed high pressure compressor (HPC) rotor 49. The HPT section 36A includes a bladed high pressure turbine (HPT) rotor 50. The LPT section 36B includes a bladed low pressure turbine (LPT) rotor 51. Each of these engine rotors 48-51 includes at least one rotor base (e.g., a disk or a hub) and at least one array (e.g., stage) of rotor blades arranged circumferentially around and connected to the respective rotor base. The rotor blades, for example, may be formed integral with or mechanically fastened, welded, brazed and/or otherwise attached to the respective rotor base.

The LPC rotor 48 is connected to the LPT rotor 51 through a low speed shaft 54. At least (or only) the LPC rotor 48, the LPT rotor 51 and the low speed shaft 54 collectively form a low speed rotating structure 56. The HPC rotor 49 is connected to the HPT rotor 50 through a high speed shaft 58. At least (or only) the HPC rotor 49, the HPT rotor 50 and the high speed shaft 58 collectively form a high speed rotating structure 60. Each of the engine rotating structures 56, 60 (e.g., spools) is rotatably supported by a plurality of bearings connected to the engine housing 40. Each of the engine rotating structures 56, 60 is thereby operable to rotate about a respective rotational axis, which rotational axis may be parallel with (e.g., coaxial to) the axial centerline 38.

The low speed rotating structure 56 of FIG. 1 is connected to the generator rotor 30 (the driven rotor 28) through a drivetrain 62. This drivetrain 62 may be a direct drive drivetrain where, for example, the drivetrain 62 includes a driveshaft which extends between and couples the low speed rotating structure 56 to the generator rotor 30. With such an arrangement, the low speed rotating structure 56 and the generator rotor 30 may rotate at a common (the same) rotational velocity. Alternatively, the drivetrain 62 may be a geared drivetrain where, for example, the drivetrain 62 includes a geartrain 64 (e.g., an epicyclic gear system, a transmission, etc.) between and coupling the low speed rotating structure 56 to the generator rotor 30. With such an arrangement, the low speed rotating structure 56 may rotate at a different rotational velocity than the generator rotor 30. While the drivetrain 62 is shown in FIG. 1 as axially between the turbine section 36 and the generator rotor 30 (the driven rotor 28), it is contemplated the drivetrain 62 may alternatively be axially between the compressor section 34 and the generator rotor 30 (the driven rotor 28) in other embodiments.

During powerplant operation, air is directed into the core flowpath 32 through the core inlet 44. This air entering the core flowpath 32 may be referred to as "core air". The core air is compressed by the LPC rotor 48 and the HPC rotor 49 and directed into the combustion chamber 42 within a (e.g., annular) combustor 66 of the combustor section 35. Fuel is injected into the combustion chamber 42 and mixed with the compressed core air to provide a fuel-air mixture. This fuel-air mixture is ignited and combustion products thereof flow through and sequentially cause the HPT rotor 50 and the LPT rotor 51 to rotate. The rotation of the HPT rotor 50 and the LPT rotor 51 respectively drive rotation of the HPC rotor 49 and the LPC rotor 48 and, thus, compression of the air received from the core inlet 44. The rotation of the LPT rotor 51 also drives rotation of the generator rotor 30 (the driven rotor 28) through the drivetrain 62. The rotation of the generator rotor 30 facilitates generation of electricity by the electric power generator.

Figure 2:
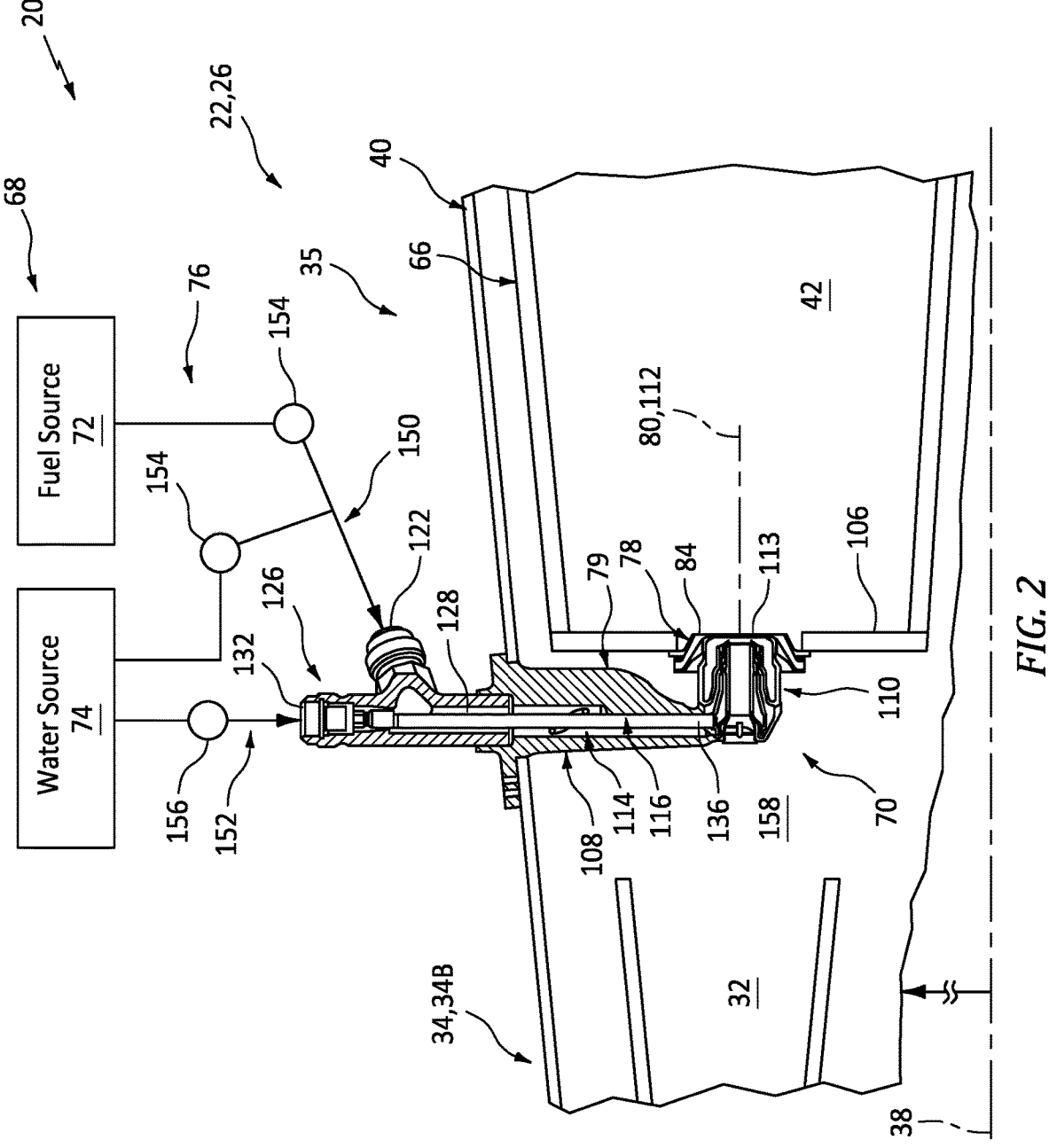
FIG. 2 is a partial schematic sectional illustration of the powerplant at a combustor section of the turbine engine.

Referring to FIG. 2, the powerplant 20 includes a fluid system 68 (e.g., a fuel-water delivery system) for delivering the fuel for combustion within the combustion chamber 42. This fluid system 68 includes one or more fuel injector assemblies 70 (see also FIG. 3), a fuel source 72 (e.g., a fuel reservoir, a fuel pipeline, etc.), a water source 74 (e.g., a water reservoir, a water pipeline, etc.) and a fluid delivery system 76 for selectively coupling the fuel source 72 and the water source 74 to each fuel injector assembly 70.

Figure 3:
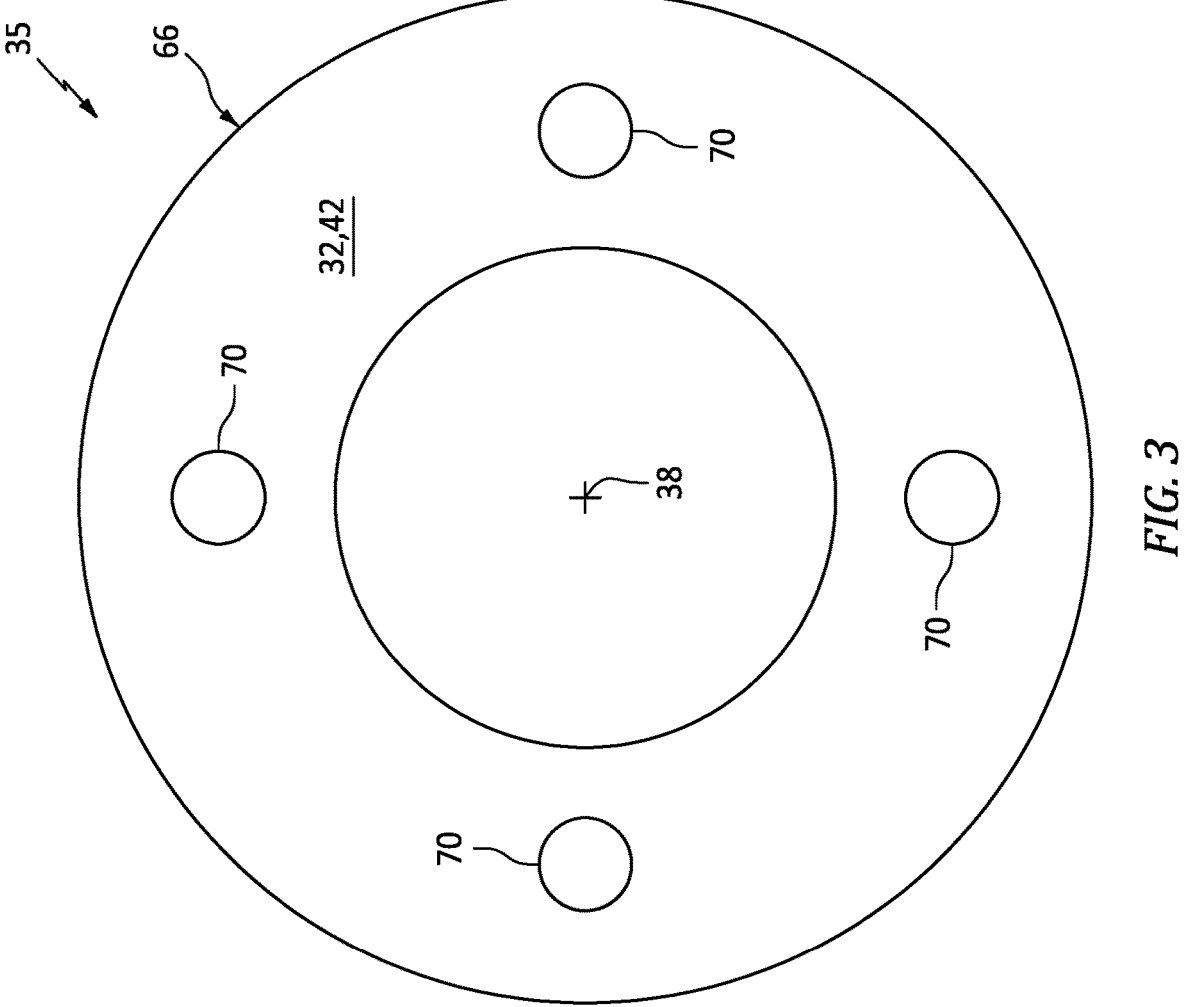
FIG. 3 is a schematic illustration of a plurality of fuel injector assemblies arranged with a combustor.
Figure 4:
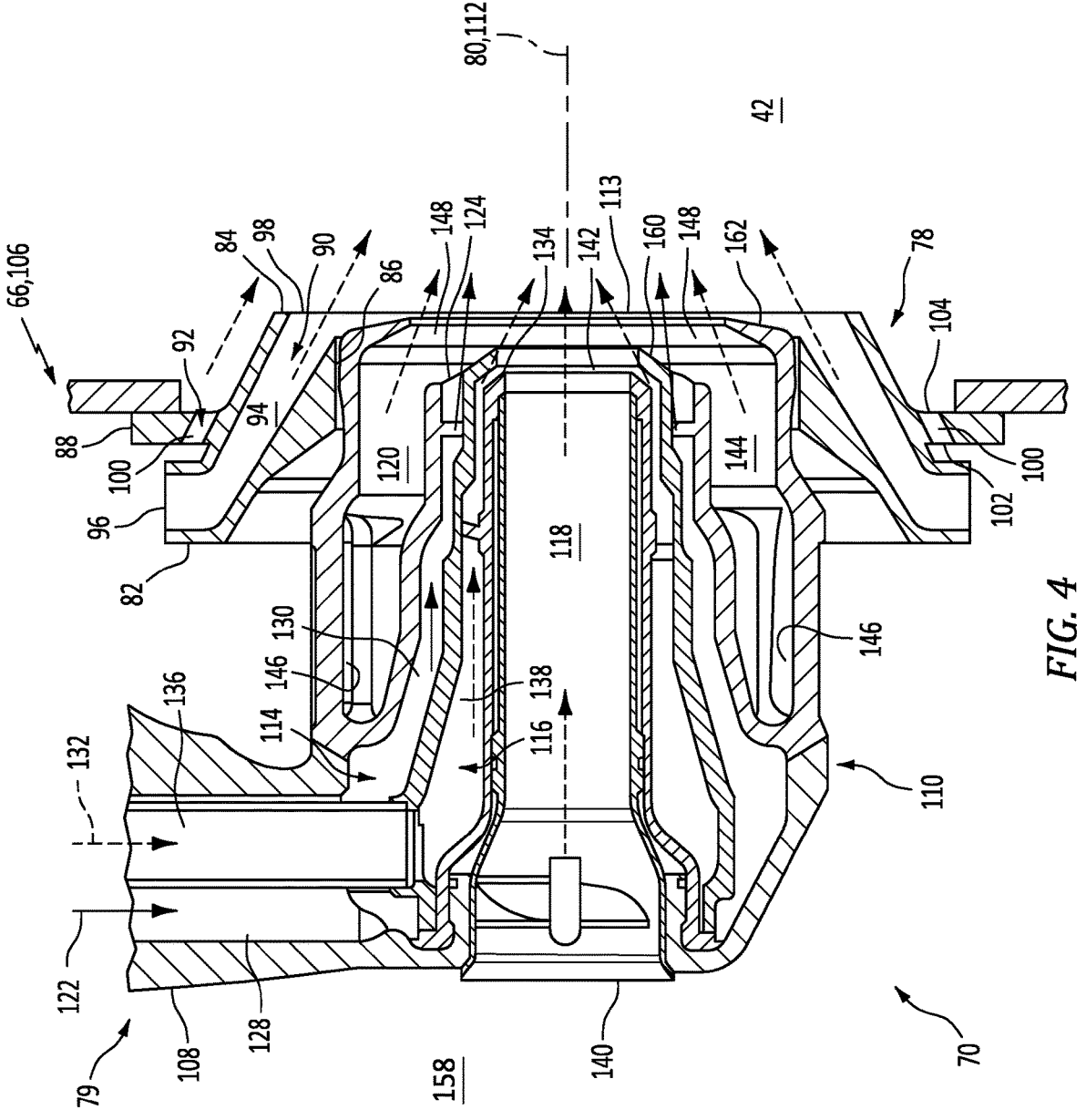
FIG. 4 is a partial sectional illustration of one of the fuel injector assemblies mounted with a bulkhead of the combustor.

Referring to FIG. 3, the fuel injector assemblies 70 are arranged circumferentially about the axial centerline 38 in an array; e.g., a circular array. Referring to FIG. 4, each of the fuel injector assemblies 70 includes an air swirler structure 78 (e.g., a guide swirler) and a fuel injector 79.

The swirler structure 78 extends axially along a centerline axis 80 of the swirler structure 78 from an upstream end 82 of the swirler structure 78 to a downstream end 84 of the swirler structure 78. The swirler structure 78 extends radially (relative to the swirler axis 80) from an inner side 86 of the swirler structure 78 to an outer side 88 of the swirler structure 78. The swirler structure 78 extends circumferentially about (e.g., completely around) the swirler axis 80. The swirler structure 78, for example, may have a full-hoop (e.g., annular) geometry. The swirler structure 78 of FIG. 4 includes an guide swirler passage 90 and a swirler cooling passage 92/a purge passage.

The guide swirler passage 90 may be formed by or otherwise include an annular swirler channel 94. This swirler channel 94 extends longitudinally through a base of the swirler structure 78 from an inlet 96 into the guide swirler passage 90 to an outlet 98 from the guide swirler passage 90. The guide swirler passage inlet 96 of FIG. 4 is disposed at (e.g., on, adjacent or proximate) the structure outer side 88, adjacent or near the structure upstream end 82. The guide swirler passage outlet 98 of FIG. 4 is disposed at the structure downstream end 84, adjacent or near the structure inner side 86. With this arrangement, at least a downstream end portion of the guide swirler passage 90 and its swirler channel 94 radially tapers (e.g., converges) as the guide swirler passage 90 extends longitudinally to its guide swirler passage outlet 98. The guide swirler passage 90 may also include one or more vanes (e.g., at its inlet 96) configured to swirl air flowing longitudinally within the guide swirler passage 90 circumferentially about the swirler axis 80.

The cooling passage 92 may be formed by or otherwise include a plurality of cooling apertures 100/purge apertures arranged circumferentially about the swirler axis 80 in an array; e.g., a circular array. Each of these cooling apertures 100 extends longitudinally through a flange of the swirler structure 78 from an inlet 102 into the cooling passage 92

(e.g., an array of inlet orifices) to an outlet 104 from the cooling passage 92 (e.g., an array of outlet orifices). The cooling passage inlet 102 of FIG. 4 is disposed in an upstream side of the flange. The cooling passage outlet 104 of FIG. 4 is disposed in a downstream side of the flange, and radially inboard of the cooling passage inlet 102. With this arrangement, the cooling passage 92 radially tapers (e.g., converges) as the cooling passage 92 extends longitudinally to its cooling passage outlet 104.

The swirler structure 78 may be (e.g., movably) mounted to a bulkhead 106 of the combustor 66. The flange, for example, may be abutted axially against and coupled to the bulkhead 106. This coupling between the swirler structure 78 and the bulkhead 106 may be a compliant coupling such that, for example, the swirler structure 78 can shift (e.g., slide) radially and/or circumferentially relative to the bulkhead 106 to facilitate differential thermal expansion between the respective fuel injector assembly 70 and the combustor 66 and its bulkhead 106.

The fuel injector 79 of FIG. 2 includes a fuel injector stem 108 and a fuel injector nozzle 110. The injector stem 108 is configured to support and route fluid to the injector nozzle 110 from an exterior of the engine housing 40. The injector nozzle 110 is cantilevered from the injector stem 108. The injector nozzle 110 projects along a centerline axis 112 of the injector nozzle 110 into a bore of the swirler structure 78, which nozzle axis 112 may be parallel with (e.g., coaxial to) the swirler axis 80. A tip 113 of the injector nozzle 110 may disposed within the swirler bore, or otherwise at the structure downstream end 84. The fuel injector 79 of FIG. 4 is configured with one or more fluid passages 114 and 116 and may be configured with one or more air passages 118 and 120. Here, the fuel injector 79 and its injector nozzle 110 may be configured to move (e.g., translate) axially along the axis 80, 112 to further facilitate differential thermal expansion between the respective fuel injector assembly 70 and the combustor 66 and its bulkhead 106.

The first fluid passage 114 (e.g., a gaseous fluid passage) extends longitudinally through the fuel injector 79 from an inlet 122 (see also FIG. 2) into the first fluid passage 114 to an outlet 124 from the first fluid passage 114. The first fluid passage inlet 122 is disposed at an exterior end 126 (see FIG. 2) of the injector stem 108. The first fluid passage outlet 124 is disposed at the nozzle tip 113. The first fluid passage 114 of FIG. 4 includes a first passage conduit 128 in the injector stem 108 and an annular first passage channel 130 in the injector nozzle 110. The first passage conduit 128 fluidly couples the first fluid passage inlet 122 to the first passage channel 130. The first passage conduit 128 of FIG. 4, for example, extends longitudinally within the fuel injector 79 and its injector stem 108 from the first fluid passage inlet 122 to the first passage channel 130. The first passage channel 130 fluidly couples the first passage conduit 128 to the first fluid passage outlet 124. The first passage channel 130 of FIG. 4, for example, extends longitudinally within the fuel injector 79 and its injector nozzle 110 from the first passage conduit 128 to the first fluid passage outlet 124. This first passage channel 130 extends circumferentially around and may be coaxial with the nozzle axis 112.

The second fluid passage 116 (e.g., a liquid fluid passage) extends longitudinally through the fuel injector 79 from an inlet 132 (see also FIG. 2) into the second fluid passage 116 to an outlet 134 from the second fluid passage 116. The second fluid passage inlet 132 is disposed at the exterior end 126 (see FIG. 2) of the injector stem 108. The second fluid passage outlet 134 is disposed at the nozzle tip 113. The second fluid passage 116 of FIG. 4 includes a second passage conduit 136 in the injector stem 108 and an annular second passage channel 138 in the injector nozzle 110. The second passage conduit 136 fluidly couples the second fluid passage inlet 132 to the second passage channel 138. The second passage conduit 136 of FIG. 4, for example, extends longitudinally within the fuel injector 79 and its injector stem 108 from the second fluid passage inlet 132 to the second passage channel 138. The second passage channel 138 fluidly couples the second passage conduit 136 to the second fluid passage outlet 134. The second passage channel 138 of FIG. 4, for example, extends longitudinally within the fuel injector 79 and its injector nozzle 110 from the second passage conduit 136 to the second fluid passage outlet 134. This second passage channel 138 extends circumferentially around and may be coaxial with the nozzle axis 112. Here, the second passage channel 138 and the second fluid passage outlet 134 are respectively radially inboard of the first passage channel 130 and the first fluid passage outlet 124. The first fluid passage outlet 124 may also be (e.g., slightly) axially recessed upstream from the second fluid passage outlet 134. At least a downstream end portion of the second fluid passage 116 and its second passage channel 138 radially tapers (e.g., converges) as the second fluid passage 116 extends longitudinally to its second fluid passage outlet 134.

The inner air passage 118 may be formed by or otherwise include a central bore through the injector nozzle 110. The inner air passage 118 extends longitudinally through the injector nozzle 110 from an inlet 140 into the inner air passage 118 to an outlet 142 from the inner air passage 118. The inner air passage inlet 140 is disposed at an upstream end of the injector nozzle 110. The inner air passage outlet 142 is disposed at the nozzle tip 113, which nozzle tip 113 of FIG. 4 is axially opposite the nozzle upstream end. Here, the inner air passage 118 is radially inboard of each of the fluid passages 114 and 116 within the injector nozzle 110. The first passage channel 130 and the second passage channel 138 of FIG. 4, for example, each circumscribe the inner air passage 118. The inner air passage 118 may also include an air swirler configured to swirl (e.g., at its inlet 140) air flowing longitudinally within the inner air passage 118 circumferentially about the nozzle axis 112.

The outer air passage 120 may be formed by or otherwise include an annular air passage channel 144. The outer air passage 120 extends longitudinally through the injector nozzle 110 from an inlet 146 into the outer air passage 120 to an outlet 148 from the outer air passage 120. The outer air passage inlet 146 is disposed at an outer side of the injector nozzle 110. The outer air passage outlet 148 is disposed at the nozzle tip 113 Here, the outer air passage 120 is radially outboard of the each of the injector passages 114, 116 and 118. The outer air passage 120 may thereby circumscribe each of the injector passages 114, 116, 118. At least a downstream end portion of the outer air passage 120 and its air passage channel 144 radially tapers (e.g., converges) as the outer air passage 120 extends longitudinally to its outer air passage outlet 148. The outer air passage 120 may also include one or more vanes and/or circumferentially canted inlet orifices (e.g., at its inlet 146) configured to swirl air flowing longitudinally within the outer air passage 120 circumferentially about the swirler axis 80.

Referring to FIG. 2, the fluid delivery system 76 includes a first passage circuit 150 and a second passage circuit 152. The first passage circuit 150 fluidly couples the fuel source 72 and the water source 74 to the first fluid passage 114 and its first fluid passage inlet 122. This first passage circuit 150 may include one or more first flow regulators 154 (e.g., valves, pumps, etc.) configured to control fluid flow (e.g., meter fluid) from each fluid source 72, 74 to the first fluid passage 114. The second passage circuit 152 fluidly couples the water source 74 to the second fluid passage 116 and its second fluid passage inlet 132. This second passage circuit 152 may include at least one second flow regulator 156 (e.g., valve, pump, etc.) configured to control fluid flow (e.g., meter fluid) from the water source 74 to the second fluid passage 116.

FIG. 5 is a flow diagram of a method 500 of operation for a powerplant. For ease of description, the operating method 500 is described below with reference to the powerplant 20 of FIG. 1 and its fluid system 68 of FIGS. 2-4. The operating method 500 of the present disclosure, however, is not limited to such an exemplary arrangements as discussed below in further detail.

In step 502, the first passage circuit 150 delivers a fuel-water mixture to each fuel injector 79 and its first fluid passage 114. The first passage circuit 150, for example, may mix gaseous fuel received from the fuel source 72 with liquid water (e.g., a mist of liquid water) received from the water source 74 within a volume outside of the respective fuel injector 79. This fuel-water mixture may then be directed into the first fluid passage 114 through its respective inlet 122.

In step 504, the fuel-water mixture is injected into the combustion chamber 42. The fuel-water mixture, for example, is directed through the first fluid passage 114 to its respective outlet 124. This fuel-water mixture may then be directed out of the injector nozzle 110 through the first fluid passage outlet 124 and into the combustion chamber 42 as an annular flow of the fuel-water mixture. The fuel-water mixture directed out of the first fluid passage outlet 124 may still be composed of the liquid water and the gaseous fuel. Here, the gaseous fuel may be a non-hydrocarbon fuel such as hydrogen fuel; e.g., hydrogen ($H_2$) gas.

In step 506, the second passage circuit 152 delivers additional liquid water to each fuel injector 79 and its second fluid passage 116. The second passage circuit 152, for example, directs the additional liquid water from the water source 74 into the second fluid passage 116 through its respective inlet 132.

In step 508, the additional liquid water is injected into the combustion chamber 42. The additional liquid water, for example, is directed through the second fluid passage 116 to its respective outlet 134. This additional liquid water may then be directed out of the injector nozzle 110 through the second fluid passage outlet 134 and into the combustion chamber 42 as an annular flow of the additional liquid water. Here, the flow of the additional liquid water is radially inboard of and circumscribed by the flow of the fuel-water mixture.

In step 510, each fuel injector assembly 70 directs compressed air into the combustion chamber 42. Each passage 90, 92, 118 and 120, for example, directs compressed core air from a plenum 158 surrounding and/or otherwise adjacent the combustor 66 into the combustion chamber 42 as a respective flow of compressed air. Here, the flows of the compressed air output from the passages 118 and 120 radially shroud the flow of the fuel-water mixture and the flow of the additional liquid water.

In step 512, the gaseous fuel and the compressed air mix within the combustion chamber 42 to provide the fuel air mixture. In step 514, the fuel-air mixture is ignited to generate combustion products and power operation of the powerplant 20 and its turbine engine 22 as described above.

A non-hydrocarbon fuel such as the hydrogen gas may have a relatively quick flame speed. The injector nozzle 110 and its nozzle tip 113 therefore may be subject to relatively high temperatures, particular at its face surfaces 160 and 162 (see FIG. 4). The temperatures of the face surfaces 160 and 162, however, may be reduced by injecting the liquid water into the combustion chamber 42. The water may provide a fluid barrier along the face surface 160, 162, delay combustion of the hydrogen gas and promote, for example, slightly deeper penetration, and/or reduce flame holding at the nozzle tip 113. The inclusion of the liquid water in the fuel-water mixture, in particular, may reduce the temperature of the outer face surface 162 at the nozzle tip 113. This may facilitate fueling the turbine engine 22 combustion process, for example, completely (e.g., only) with the hydrogen fuel.

Each fuel injector 79 may inject a first quantity (A) of water into the combustion chamber 42 via the fuel-water mixture flow; e.g., through the first fluid passage 114 and its outlet 124. Each fuel injector 79 may inject a second quantity of water (B) into the combustion chamber 42 via the additional liquid water flow; e.g., through the second fluid passage 116 and its outlet 134. A ratio of the first quantity of water to the second quantity of water (A/B) may be less than one (1); e.g., A/B<1. The first quantity of water, for example, may account for between thirty percent (30%) and seventy percent (70%) of the water injected into the combustion chamber 42 by the respective fuel injector 79. For example, where higher combustion temperatures are expected (e.g., fueling with only hydrogen gas), the first quantity of water may account for between forty percent (40%) and sixty percent (60%) of the water injected into the combustion chamber 42 by the respective fuel injector 79. In another example, where lower combustion temperatures are expected (e.g., fueling with a mixture of gases as discussed below), the first quantity of water may account for between thirty percent (30%) and forty percent (40%) of the water injected into the combustion chamber 42 by the respective fuel injector 79. The present disclosure, however, is not limited to the foregoing exemplary relationships as cooling parameters may change based on nozzle design.

Figure 6:
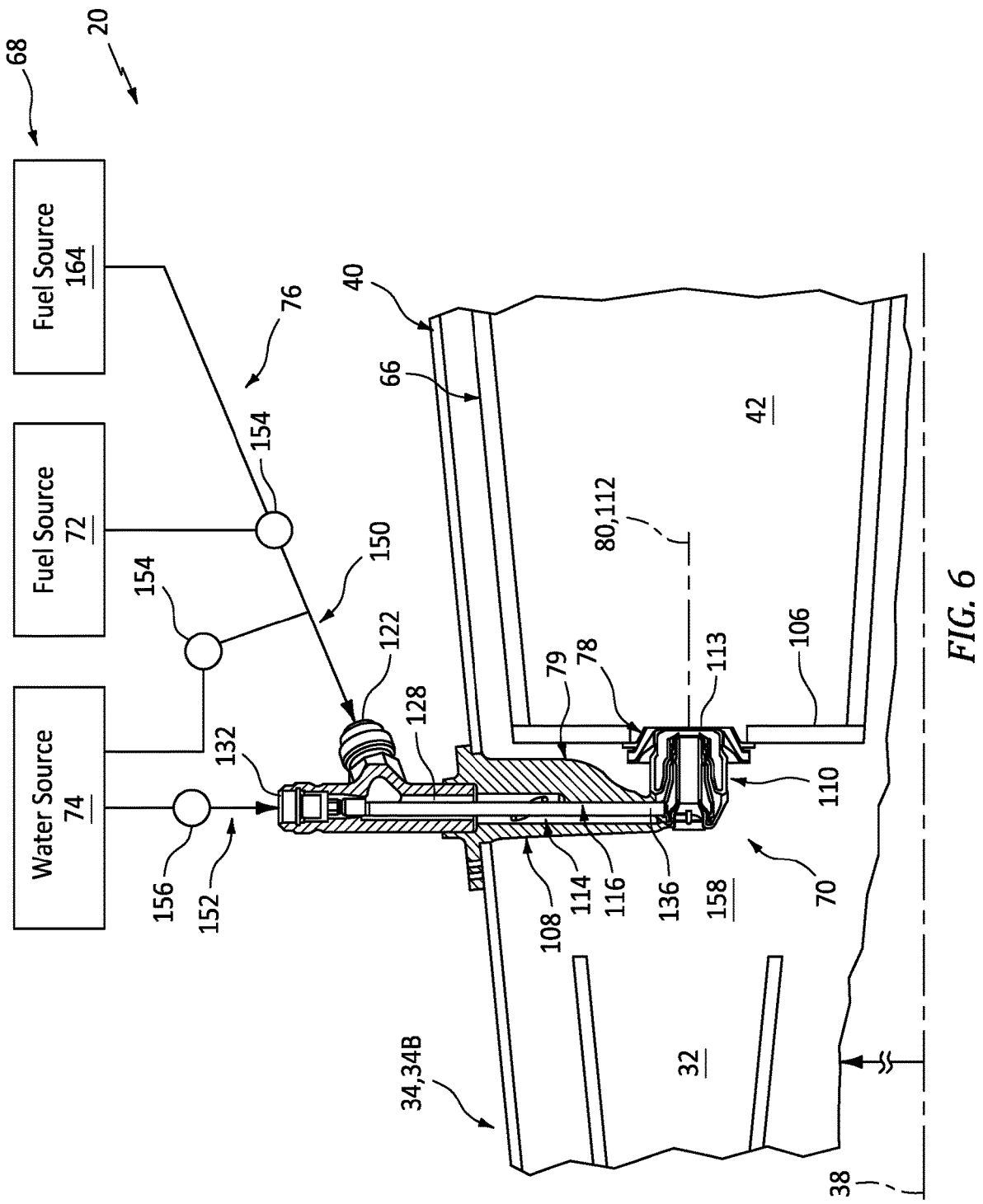
FIGS. 6 and 7 are partial schematic sectional illustrations of the powerplant at the combustor section with various fluid systems.

Referring to FIG. 6, the fluid system 68 may include a second fuel source 164 (e.g., a fuel reservoir, a fuel pipeline, etc.). For example, where the first fuel source 72 provides the non-hydrocarbon fuel such as the hydrogen gas, the second fuel source 164 may provide a hydrocarbon fuel such as gaseous methane (e.g., natural gas). In one mode of operation, the first passage circuit 150 of FIG. 6 may be operated to (e.g., only) mix the hydrogen gas with the liquid water to provide the fuel-water mixture as described above. In another mode of operation, the first passage circuit 150 may be operated to mix both the hydrogen gas and the methane gas with the liquid water to provide the fuel-water mixture. In another mode of operation, the first passage circuit 150 may be operated to (e.g., only) mix the hydrogen gas with the methane gas (without the liquid water) to provide a fuel mixture to the first fluid passage 114 rather than the fuel-water mixture. In still another mode of operation, the first passage circuit 150 may be operated to (e.g., only) provide the methane gas to the first fluid passage 114 rather than the fuel-water mixture. In this mode, no water is mixed with the methane gas directed through the first fluid passage 114. During each of these modes, the second passage circuit 152 may continue to provide the additional liquid water to the second fluid passage 116 as described above.

Where the first passage circuit 150 provides a mixture of the hydrogen gas and the methane gas, the mixture of the hydrogen gas and the methane gas may be selectively tailored. The first passage circuit 150, for example, may mix a first quantity (X) of the hydrogen gas with a second quantity (Y) of the methane gas. A ratio of the first quantity of the hydrogen gas to the second quantity of the methane gas (e.g., X/Y) may be less or equal to than one (1); e.g., $X/Y \leq 1$. However, it is contemplated the ratio of the first quantity of the hydrogen gas to the second quantity of the methane gas (e.g., X/Y) may alternatively be greater than one (1) (e.g., X/Y>1) to reduce, for example, emission of pollutants generated by combustion of a hydrocarbon fuel. In general, as the ratio of X/Y increases, the quantity of the liquid water mixed with the gaseous fuel within the first passage circuit 150 also increases to compensate for the higher hydrogen fuel content, which may promote fastener flame speed and/or high combustion temperature. In some embodiments, where the hydrogen gas accounts for thirty percent (30%) or more of the mixture of the hydrogen gas and the methane gas (up to 100% hydrogen gas, 0% methane gas), at least thirty percent (30%) of the water introduced into the combustion chamber 42 by the respective fuel injector 79 may flow through the first fluid passage 114 with the gaseous fuel. The balance of the water may flow through the second fluid passage 116.

While the examples provided above include hydrogen gas and/or methane gas, the present disclosure is not limited to such exemplary gas fuels. For example, it is contemplated other non-hydrocarbon fuels such as, but not limited to, gaseous ammonia ($NH_3$ gas) may be provided by the first fuel source 72. In addition or alternatively, it is contemplated other hydrocarbon fuels such as, but not limited to, propane gas may be provided by the second fuel source 164.

Figure 7:
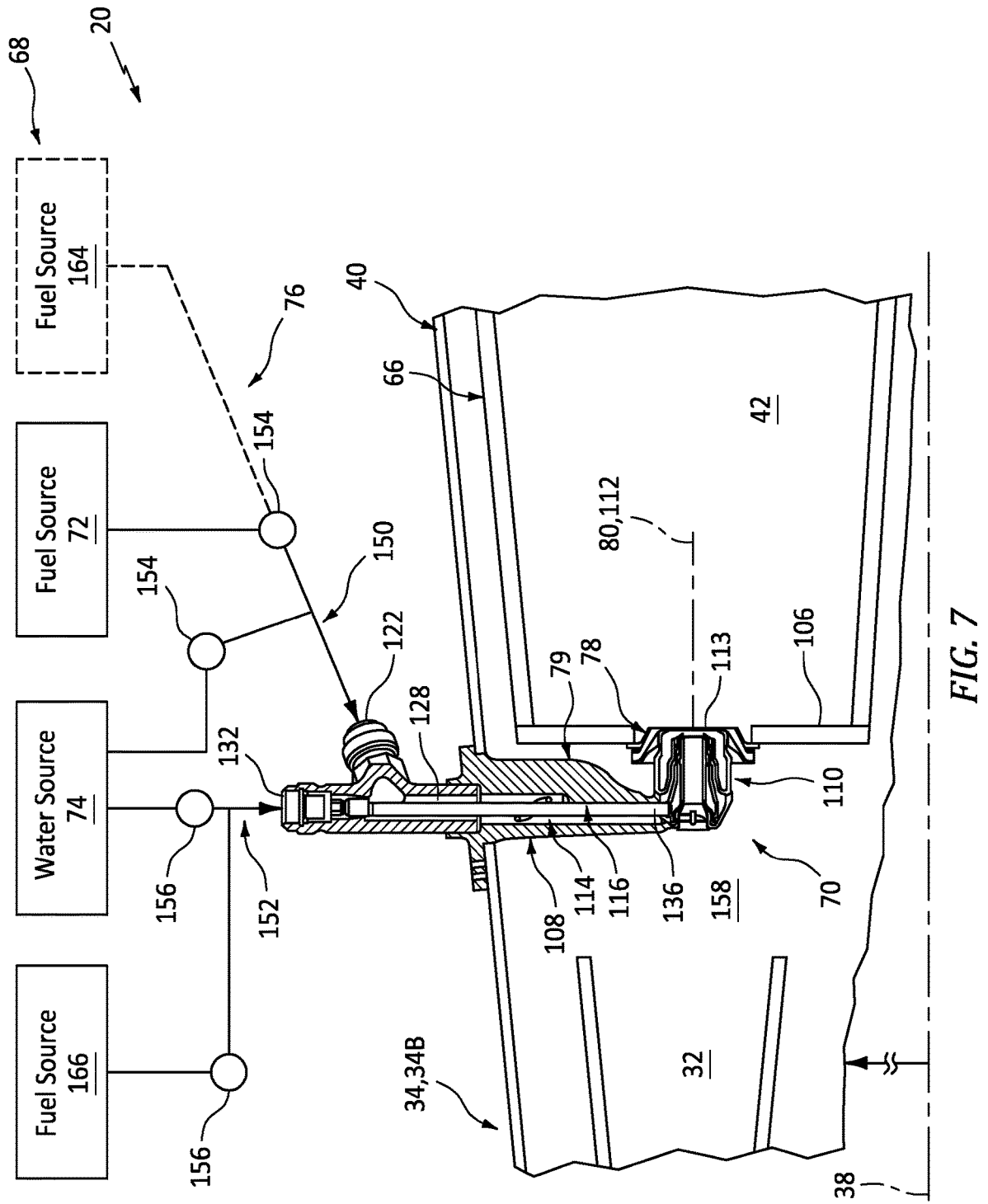

Referring to FIG. 7, the fluid system 68 may also or alternatively include another fuel source (e.g., a fuel reservoir, a fuel pipeline, etc.)—a third fuel source 166 in FIG. 7. This third fuel source 166 may provide a liquid fuel; e.g., a liquid hydrocarbon fuel such as liquid Jet A fuel or liquid No. 2 fuel oil. This third fuel source 166 may be provided as a backup fuel source for use in, for example, a backup mode of operation. For example, when selected, the second passage circuit 152 may mix the liquid water and the liquid fuel to provide a liquid fuel-water mixture. This liquid fuel-water mixture may then be directed into the second fluid passage 116 for injection into the combustion chamber 42 and combustion of the liquid fuel. However, during such a mode of operation, the first passage circuit 150 may close; e.g., fluidly decouple each fluid source (e.g., 72, 74, 164) from the first fluid passage 114. Thus, during this mode of operation, no fluid may flow through the first fluid passage 114.

Another example of fuel injector assemblies which may be used with the operating method 500 of the present disclosure is disclosed in U.S. Pat. No. 10,228,137, which is hereby incorporated herein by reference in its entirety.

Figure 8:
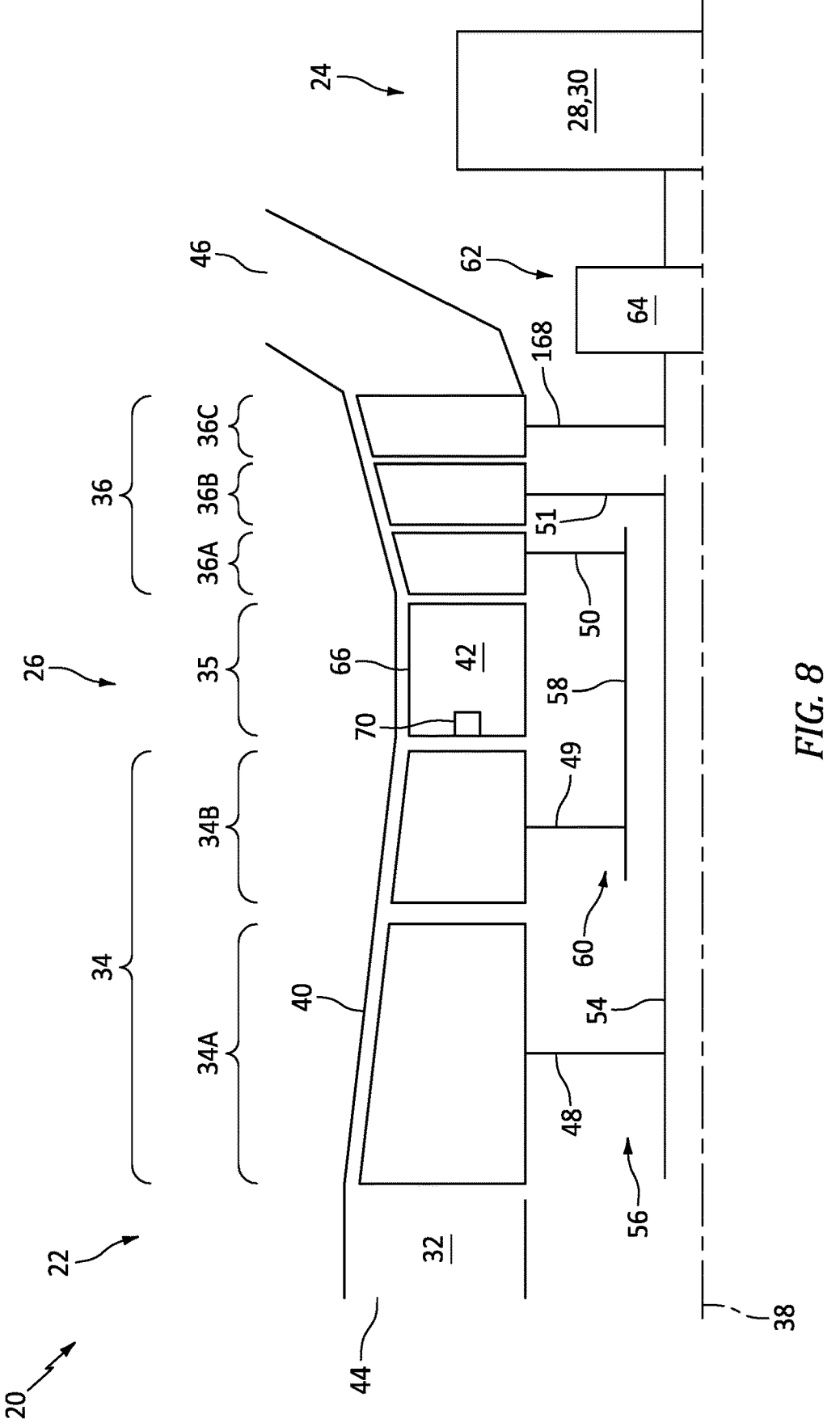
FIG. 8 is a partial schematic illustration of the powerplant with a power turbine section.

The engine core 26 is shown in FIG. 1 with two rotating assemblies 56 and 60. It is contemplated, however, the engine core 26 may alternatively be configured with a single rotating assembly, or with three or more rotating assemblies. The engine core 26 of FIG. 8, for example, is configured with an additional turbine rotor 168 (e.g., a power turbine (PT) rotor) coupled to and configured to drive rotation of the driven rotor 28; e.g., power the mechanical load 24. Here, the turbine rotor 168 is disposed within a power turbine section 36C of the turbine section 36, which power turbine section 36C is downstream of the turbine section 36B (here, an intermediate turbine section) along the core flowpath 32.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
directing a fuel-water mixture within a first passage of a fuel injector to a first passage outlet of the fuel injector, the fuel-water mixture including liquid water and gaseous fuel, wherein the gaseous fuel comprises hydrogen gas and methane gas, and a first ratio of quantities of the hydrogen gas to the methane gas is less than or equal to one;
injecting the fuel-water mixture into a combustion chamber through the first passage outlet, the combustion chamber within a combustor of a turbine engine;
directing additional liquid water within a second passage of the fuel injector to a second passage outlet of the fuel injector, wherein the second passage is fluidly discrete from the first passage, the additional liquid water and the liquid water of the fuel-water mixture are received from a common water source, and a second ratio of quantities of the liquid water within the fuel-water mixture to the additional liquid water is directly proportional to the first ratio;
injecting the additional liquid water into the combustion chamber through the second passage outlet; and
igniting a fuel-air mixture within the combustion chamber, the fuel-air mixture comprising the gaseous fuel.

2. The method of claim 1, wherein the fuel-water mixture consists of the liquid water and the hydrogen gas.

3. The method of claim 1, further comprising:
mixing the liquid water with the gaseous fuel outside of the fuel injector to provide the fuel-water mixture; and
directing the fuel-water mixture into the fuel injector through a first passage inlet of the fuel injector.

4. The method of claim 1, wherein the second ratio is less than one.

5. The method of claim 1, wherein the liquid water within the fuel-water mixture accounts for between thirty percent and fifty percent of water introduced into the combustion chamber through the fuel injector.

6. The method of claim 1, wherein
the additional liquid water is injected into the combustion chamber as a flow of the additional liquid water; and
the fuel-water mixture is injected into the combustion chamber as a flow of the fuel-water mixture, and the flow of the fuel-water mixture circumscribes the flow of the additional liquid water.

7. The method of claim 1, further comprising:
directing a flow of compressed air out of the fuel injector as a flow of compressed air;
the fuel-water mixture injected into the combustion chamber as a flow of the fuel-water mixture, and the flow of the fuel-water mixture circumscribing the flow of compressed air.

8. The method of claim 1, further comprising:
directing a flow of compressed air out of the fuel injector as a flow of compressed air;
the fuel-water mixture injected into the combustion chamber as a flow of the fuel-water mixture, and the flow of compressed air circumscribing the flow of the fuel-water mixture.

9. A method of operation, comprising:
injecting a fuel-water mixture out of a fuel injector and into a combustion chamber, the fuel-water mixture including liquid water and gaseous fuel, the gaseous fuel comprising hydrogen gas and methane gas, and the combustion chamber within a combustor of a turbine engine, wherein a first ratio of quantities of the hydrogen gas to the methane gas is less than or equal to one;
injecting additional liquid water out of the fuel injector and into the combustion chamber, wherein the additional liquid water and the liquid water of the fuel-water mixture are received from a common water source, and a second ratio of quantities of the liquid water within the fuel-water mixture to the additional liquid water is directly proportional to the first ratio;
igniting a fuel-air mixture within the combustion chamber to generate combustion products, the fuel-air mixture comprising the gaseous fuel; and
directing the combustion products across a turbine rotor of the turbine engine to drive rotation of the turbine rotor and rotation of a driven rotor of a mechanical load coupled to the turbine rotor.

10. A method of operation, comprising:
operating a fluid system of a turbine engine in a first mode, the operating of the fluid system in the first mode comprising
directing a fuel-water mixture out of a first passage of a fuel injector and into a combustion chamber, the fuel-water mixture including liquid water and a first gaseous fuel, and the combustion chamber within a combustor of a turbine engine, wherein the first gaseous fuel comprises hydrogen gas and methane gas, and a first ratio of quantities of the hydrogen gas to the methane gas is less than or equal to one;
directing additional liquid water out of a second passage of the fuel injector, wherein the second passage is fluidly discrete from the first passage, and the additional liquid water and the liquid water of the fuel-water mixture are received from a common water source, and a second ratio of quantities of the liquid water within the fuel-water mixture to the additional liquid water is directly proportional to the first ratio; and
igniting a first fuel-air mixture within the combustion chamber, the first fuel-air mixture comprising the first gaseous fuel; and
operating the fluid system in a second mode, the operating of the fluid system in the second mode comprising
directing a second gaseous fuel out of the first passage and into the combustion chamber; and
igniting a second fuel-air mixture within the combustion chamber, the second fuel-air mixture comprising the second gaseous fuel.

11. The method of claim 10, wherein the second gaseous fuel is directed through the first passage without any liquid water during the second mode.

12. The method of claim 10, wherein
the second gaseous fuel comprises a hydrocarbon fuel.

13. The method of claim 10, further comprising operating the fluid system in a third mode, the operating of the fluid system in the third mode comprising directing a liquid fuel out of a second passage of the fuel injector and into the combustion chamber; and igniting a third fuel-air mixture within the combustion chamber, the third fuel-air mixture comprising the liquid fuel.

* * * * *